United States Patent
Miller et al.

(10) Patent No.: US 11,503,958 B2
(45) Date of Patent: Nov. 22, 2022

(54) TAMPER

(71) Applicant: Vita-Mix Management Corporation, Olmsted Township, OH (US)

(72) Inventors: Mark Miller, Parma, OH (US); Robert Ulanski, Broadview Hts., OH (US)

(73) Assignee: VITA-MIX MANAGEMENT CORPORATION, Olmsted Township, OH (US)

( * ) Notice: Subject to any disclaimer, the term of this patent is extended or adjusted under 35 U.S.C. 154(b) by 657 days.

(21) Appl. No.: 16/191,795

(22) Filed: Nov. 15, 2018

(65) Prior Publication Data
US 2019/0142221 A1 May 16, 2019

Related U.S. Application Data

(60) Provisional application No. 62/586,328, filed on Nov. 15, 2017.

(51) Int. Cl.
*A47J 43/046* (2006.01)
*A47J 43/07* (2006.01)

(52) U.S. Cl.
CPC ......... *A47J 43/0716* (2013.01); *A47J 43/046* (2013.01)

(58) Field of Classification Search
CPC ..................................... A47J 43/046
USPC ........................ 366/295, 314, 347
See application file for complete search history.

(56) References Cited

U.S. PATENT DOCUMENTS

| | | |
|---|---|---|
| 1,305,777 A | 6/1919 | Cunningham |
| 2,286,012 A | 6/1942 | Rochow |
| 2,481,731 A | 9/1949 | Dubin |
| 2,606,689 A | 8/1952 | Kistner |
| 2,802,605 A | 8/1957 | Parker |
| 2,919,086 A | 12/1959 | McMahan |
| 3,107,711 A | 10/1963 | Azmus |
| 3,407,429 A | 10/1968 | Di Nardo |
| 4,561,782 A | 12/1985 | Jacobsen |
| D285,405 S | 9/1986 | Grange |
| 4,790,503 A | 12/1988 | Pohler |
| 4,993,611 A | 2/1991 | Longo |
| 5,302,021 A | 4/1994 | Jennett |

(Continued)

FOREIGN PATENT DOCUMENTS

| | | |
|---|---|---|
| FR | 2980077 | 3/2013 |
| WO | 2013120520 | 8/2013 |

OTHER PUBLICATIONS

International Search Report and Written Opinion in connection with International Patent Application No. PCT/US2018/061223, dated May 23, 2019, 22 pages.

(Continued)

*Primary Examiner* — David L Sorkin
(74) *Attorney, Agent, or Firm* — McDonald Hopkins LLC (57) ABSTRACT

A blending system includes a container and a tamper. The container includes a lid. The tamper may be inserted into the container through an aperture of the lid. The tamper extends towards but does not touch a blade assembly. The tamper is positionable in a vertical position and an angled position. The tamper includes a stop that prevents the tamper from touching the blade assembly in the first position. Another stop prevents the tamper from touching the blade in a second position. The tamper may reach toward the edges of the container in an angled position to manipulate foodstuffs.

9 Claims, 10 Drawing Sheets

(56) References Cited

U.S. PATENT DOCUMENTS

| | | |
|---|---|---|
| 5,361,950 A | 11/1994 | Signal |
| D371,089 S | 6/1996 | Yeung |
| 5,662,032 A | 9/1997 | Baratta |
| 5,887,830 A | 3/1999 | Liang |
| 5,979,673 A | 11/1999 | Dooley |
| 6,237,802 B1 | 5/2001 | Douglas |
| D453,322 S | 2/2002 | Lee |
| D458,086 S | 6/2002 | Marks et al. |
| D472,465 S | 4/2003 | Nance |
| 6,832,543 B2 | 12/2004 | Siano |
| D501,886 S | 2/2005 | Chen |
| D505,390 S | 5/2005 | Lee et al. |
| 6,935,767 B2 | 8/2005 | Nikkhah |
| 6,966,689 B2 * | 11/2005 | Daniels, Jr. ............ A47J 43/042 366/192 |
| 7,040,799 B2 | 5/2006 | Pryor |
| D551,915 S | 10/2007 | Chang Chien |
| 7,537,185 B2 | 5/2009 | Joekel |
| D603,660 S | 11/2009 | Holcomb et al. |
| 7,648,264 B2 | 1/2010 | Breviere |
| 8,157,435 B2 | 4/2012 | Pryor |
| D660,643 S | 5/2012 | Boozer et al. |
| 8,172,454 B2 | 5/2012 | Choi |
| D666,056 S | 8/2012 | Boozer et al. |
| D691,390 S | 10/2013 | Cunningham |
| D702,078 S | 4/2014 | Coakley et al. |
| 8,740,159 B2 | 6/2014 | Braun |
| D710,701 S | 8/2014 | Lai |
| D730,235 S | 5/2015 | Korzeniowski |
| 9,291,301 B2 | 3/2016 | Brinkmann |
| 2005/0023940 A1 | 2/2005 | Van Beusekom |
| 2006/0140050 A1* | 6/2006 | Lee Tsao Chiang ........................ A47J 43/0716 366/205 |
| 2008/0035590 A1 | 2/2008 | Huang |
| 2014/0286120 A1 | 9/2014 | Kolar |
| 2015/0173566 A1 | 6/2015 | Kettavong |
| 2015/0258512 A1* | 9/2015 | Haney ............... B01F 15/00058 366/205 |

OTHER PUBLICATIONS

International Search Report and Written Opinion of the International Searching Authority, PCT/US2014/071462, dated Apr. 17, 2015, 15 pages.

* cited by examiner

TAMPER

CROSS-REFERENCE TO RELATED APPLICATION

This application claims priority to U.S. Provisional Patent Application No. 62/586,328 entitled "FOOD STUFF TAMPER," filed on Nov. 15, 2017, which is incorporated herein by reference in its entirety.

TECHNICAL FIELD

The present invention relates to a blending system and, more particularly, to a blending system comprising a tamper.

BACKGROUND

Blenders and blending systems are often used to blend and process foodstuffs. Frozen, frosty, or icy drinks have become increasingly popular. Such drinks include the traditional shakes, and the more recently popular smoothies. Shakes, or milk shakes, are typically formed of ice cream and/or milk, and flavored as desired, with or without additives, such as candies, chocolates, peanut butter, fruits, etc. Milkshakes typically are available at most fast-food restaurants, such as burger chains, and may be made by special machines, or hand-made using mixers.

Smoothies tend to be healthier, and may be formed of ice, frozen yogurt, and/or sorbet. Smoothies may include additives such as fruits, fruit juice, vegetables, vitamins, supplements, etc. Smoothies typically are available from specialty chains, and may be made with commercial or restaurant-grade blenders. Such drinks also may be made at home, using a personal blender.

Conventional blenders generally include a base with a motor, and a blending container with an operable blade assembly disposed therein. A lid is adapted to cover the blending container. A user inserts contents within the blending container to be mixed by the rotation of the blade assembly. The blending container is positioned on the base as a user controls the operation of the motor within the base to rotate the blade assembly within the blending container to mix the contents therein.

Given the wide variety of uses for blenders, each blender may experience cavitation of foodstuffs outside the blade assembly that prevents adequate mixing of contents. Some blenders include tampers, such as described in U.S. Pat. No. 5,302,021, entitled METHOD OF PREVENTING THE FORMATION OF AN AIR POCKET IN A BLENDER, the entirety of which is incorporated by reference herein. Another example of a tamper is shown in Design U.S. Pat. No. D,666,056, entitled BLENDER TAMPER, the entirety of which is incorporated by reference herein. Others have introduced tampers. These tampers are used to help mix foodstuff within the container during blending. As such, tampers are designed to avoid the path of blender blenders during mixing. However, these tampers may not reach far enough toward the edges of the container. This may prevent the tampers from remedying the cavitation of foodstuffs.

Therefore, a need exists for systems and methods for a more efficient tamper. In another aspect, there is a need for a blender tamper with a longer reach when in an angled position, while not interfering with the blade assembly in any position.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

A blending system is described. The blending system may include a container, a lid comprising an aperture formed therethrough and operatively attachable to the container, a blade assembly operatively attached to the container, and a tamper comprising a mixing portion and a stopping portion, wherein the tamper is operatively insertable into the aperture in a first position where the stopping portion does not pass through the aperture, and wherein the tamper is operatively insertable into the aperture in a second position where at least a portion of the stopping portion passes through the aperture. In an example, when in the first position, the tamper is generally perpendicular to a bottom of the container. In the second position, the tamper is generally pointed in the direction of at least one of a sidewall or corner of the container. In an example, the stopping portion comprises at least a first stop and a second stop. The first stop limits insertion of the tamper into the container in the first position. The second stop does not touch the aperture in the first position. The second stop limits insertion of the tamper into the container in the second position. The stopping portion may further comprise a transition portion disposed between the first stop and the second stop, wherein the transition portion comprises at least one of a curved or angled surface. According to some examples, the first stop comprises a flange. The second stop may comprise a flange. The aperture may comprise a different shape than the first stop or the second stop.

Also described is a blending system for blending foodstuff comprising a container and a lid operatively attached to the container, the lid comprising an aperture and a plane defined by the aperture, and a tamper comprising a distal end, a handle, a first stop, and a second stop, wherein the first stop contacts the aperture when the distal end is generally parallel to the plane, and wherein the second stop contacts the aperture when the distal end is not perpendicular to the plane. The blending system may comprise a blender base comprising a motor, wherein the container is operatively attachable to the blender base. The first stop comprises a generally elliptical external perimeter, and the aperture is generally rectangular. The second stop comprises a generally elliptical external perimeter, and the aperture is generally rectangular. The handle operatively directs the position of the distal end when the tamper is inserted into the aperture and the lid is attached to the container.

Described examples may include a tamper for a blending system comprising, wherein the tamper comprises a handle, a mixing portion, and a stopping portion disposed between the handle and the mixing portion, wherein the stopping portion comprises a first stop and a second stop, and wherein the first stop has a smaller perimeter than the second stop. The stopping portion includes a transition between the first stop and the second stop, wherein the transition comprises a curved surface. The first stop and second stop comprise a round shape. The mixing portion includes a first portion proximal the first stop and a second portion disposed between the first portion and a distal end of the mixing portion, wherein the thickness of the second portion is between generally 0.03 inches and 0.08 inches.

The following description and the drawings disclose various illustrative aspects. Some improvements and novel aspects may be expressly identified, while others may be apparent from the description and drawings.

DESCRIPTION OF THE DRAWINGS

The accompanying drawings illustrate various systems, apparatuses, devices and methods, in which like reference characters refer to like parts throughout, and in which.

DETAILED DESCRIPTION

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggests otherwise.

It is noted that the various embodiments described herein may include other components and/or functionality. It is further noted that while various embodiments refer to a blender or a blender system, various other systems may be utilized in view of embodiments described herein. For example, embodiments may be utilized in food processor systems, mixing systems, hand-held blending systems, various other food preparation systems, and the like. As such, references to a blender, blender system, and the like, are understood to include food processor systems, and other mixing systems. Such systems generally include a blender base that may include a motor, a controller, a display, a memory and a processor. Further, such systems may include a blending container and a blade assembly. The blade assembly, the blending container, and the blender base may be removably or irremovably attached. The blending container may be powered in any appropriate manner, such as disclosed in U.S. patent application Ser. No. 14/213,557, entitled Powered Blending Container, which is hereby incorporated by reference. In another aspect, described blending systems may include devices and methods such as those disclosed in U.S. patent application Ser. No. 14/623,207, entitled Intelligent Blending System, which is hereby incorporated by reference.

Foodstuff may be added to the blender container. Furthermore, while blending of "ingredients," "contents" or "foodstuffs" is described by various embodiments, it is noted that non-food stuff may be mixed or blended, such as paints, epoxies, construction material (e.g., mortar, cement, etc.), and the like. Further, the blending systems may include any household blender and/or any type of commercial blending system, including those with covers that may encapsulate or partially encapsulate the blender. Further, commercial blending systems may include an overall blending system, such as a modular blending system that may include the blender along with other components, such as a cleaner, foodstuff storage device (including a refrigerator), an ice maker and/or dispenser, a foodstuff dispenser (a liquid or powder flavoring dispenser) or any other combination of such.

Moreover, blending of foodstuff or ingredients may result in a blended product. Such blended products may include drinks, frozen drinks, smoothies, shakes, soups, purees, sorbets, butter (nut), dips or the like. It is noted that various other blended products may result from blending ingredients. Accordingly, terms such as "blended product" or "drink" may be used interchangeably unless context suggests otherwise or warrants a particular distinction among such terms. Moreover, such terms are not intended to limit possible blended products and should be viewed as examples of possible blended products.

Tampers for blenders may include a handle, a stop, and a mixing portion. In an example, a user may grasp the tamper by the handle. The mixing portion is insertable into a blender container, such as through an aperture of a lid that is attached to the container. The stop prevents the mixing portion from being inserted into the container far enough to contact the blender blades. As such, tampers may not go far enough into the blending container. Further, tampers are designed to be inserted in a vertical position where the tamper is generally perpendicular to the container bottom. These tampers typically have their greatest reach when in the vertical position. When users try to maneuver the tampers to be at an angle-offset from the vertical position, the reach of the tamper may be diminished or otherwise not sufficient due to the stop and the angle at which the mixing portion extends. As such, tampers may not go far enough into the container, especially in the corners.

For example, the tamper must be stopped in the vertical orientation or position so that it is distance away from blades. The stop may be a collar or flange that limits how far the tamper can be inserted. This may cause a reach problem in containers that may be exacerbated in wider containers where the ration between the distance from a lid to the general center of the bottom of the container compared to the distance from the lid to a corner or edge of the container is generally large.

Embodiments herein describe a tamper comprising a longer or increased reach when inserted into a container at an angle relative a vertical position as described herein. As such, disclosed tampers may reach towards corners or other directions significantly further compared to some other tampers, and still not hit the blade assembly in the vertical position or any other position. For instance, a tamper with a longer reach in an angled position may be used to prevent or remedy capitation of contents in a blending container. The tamper does not interfere with a blade assembly in the blending container when the tamper is in a centered position. Thus, operation of the blender motor to drive the blade assembly will not cause the blade assembly to contact and damage the tamper.

In an example, a user may operate a blending system to blend foodstuff. During a blending process, the foodstuff may become stuck or otherwise not flow within a blending container. This may prevent adequate mixing of the contents. The user may use disclosed tampers to prevent or remedy the capitation.

Figure 1:
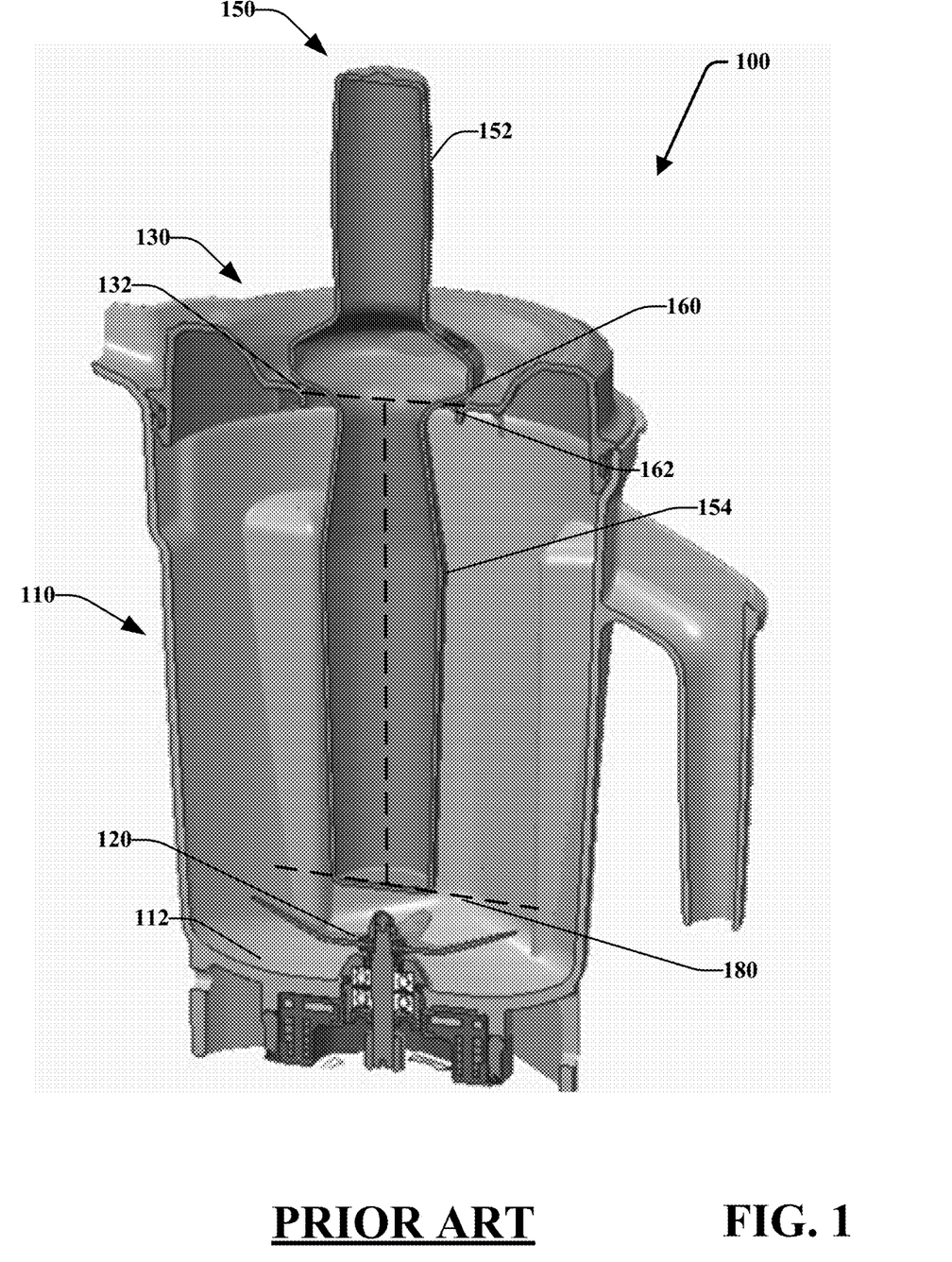
FIG. 1 is a cross-sectional view of a blending container comprising a traditional tamper in a vertical position.

Referring now to FIG. 1, depicted is a traditional blending system 100. The blending system 100 may include a blending container 110, a blade assembly 120, a lid 130, and a tamper 150. A user may place foodstuff within a cavity 112 of the container 110 and a motor, as described in more detail herein, may drive the blade assembly 120 to mix, chop, or otherwise blend the foodstuff. It is noted that the blending system 100 may detect whether the container 110, lid 130, or a blender base are appropriately connected and may prevent or allow operation of the motor based on the connectivity.

The lid 130 may comprise an aperture 132 sized and shaped to receive the tamper 150. The aperture 132 may be generally square, rectangular, elliptical, an n-sided polygon (where n is a number), elliptical, or irregular in shape. In at least one example, the aperture 132 may comprise a square shape with rounded corners. The lid 130 is attachable to the container 110 in any manner. In some embodiments, the lid 130 may be selectively and frictionally attached with the container 110.

The tamper 150 may include a handle 152, a vertical stop 162 having a perimeter or stop 160, and a mixing or tamping portion 154 comprising a terminal end. When the tamper 150 is in a centered position (as shown in FIG. 1), the stop 160 controls the depth 180 of the tamper 150 within the blending container 110 so the tamper 150 does not interfere with the blade assembly 120. The centered position is used herein to describe the position where the tamper 150 points generally at the blade assembly 120. This may comprise the tamper 150 being generally perpendicular to a bottom 112 of the container 110 and/or it may be equally distant from all of the walls of the container 110. As described herein, the aperture 132 may interact with vertical stop 162 of traditional tampers (e.g., tamper 150)

Figure 2:
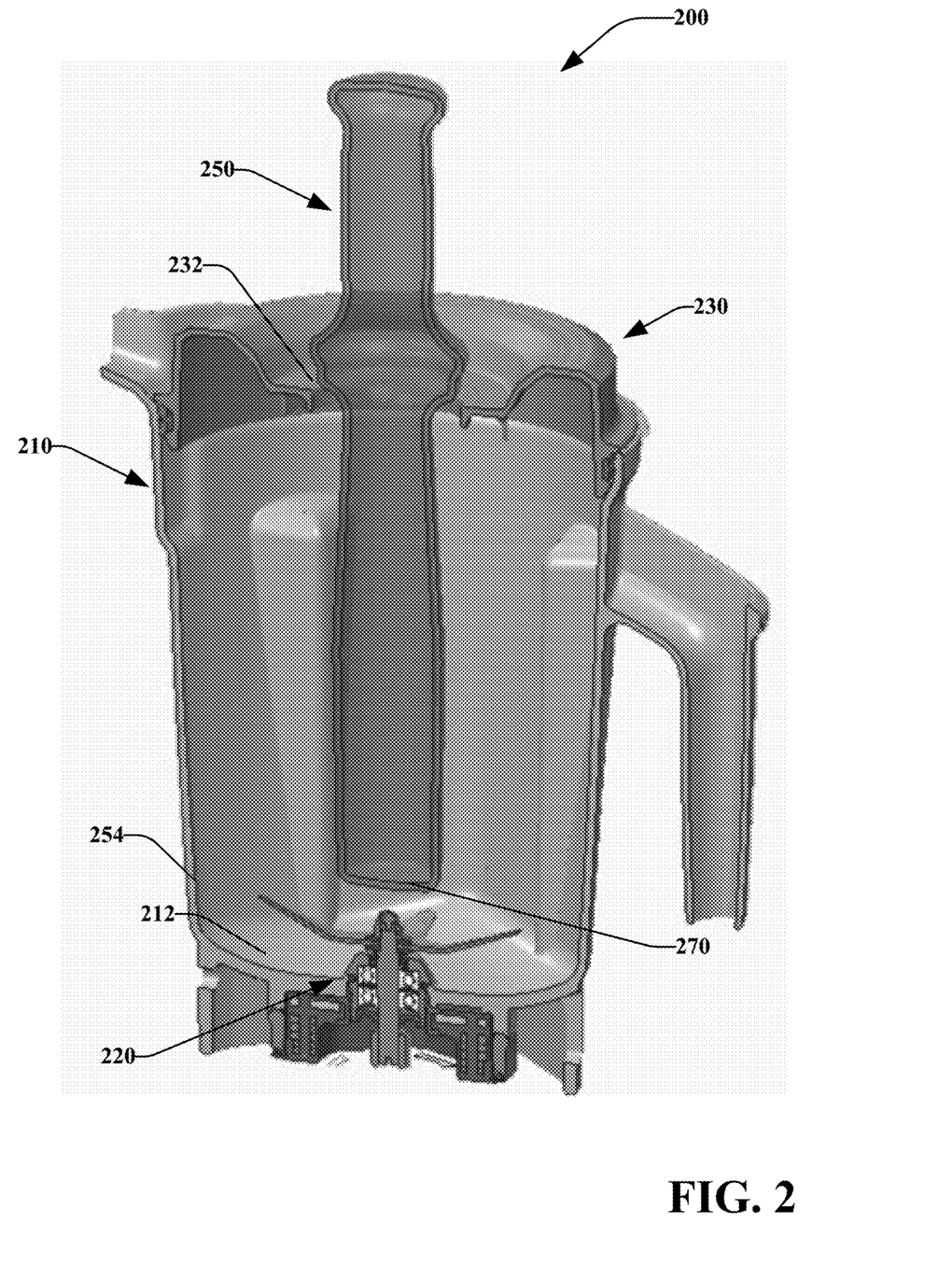
FIG. 2 is a cross-sectional view of a blending container comprising a tamper in a vertical position in accordance with various disclosed embodiments.

FIG. 2 illustrates a blending system 200 that may include a blending container 210, a blade assembly 220, a lid 230, and a tamper 250. It is noted that the container 210, blade assembly 220, and the lid 230 may comprise similar or different aspects as described with reference to various other figures, including, without limitation, FIG. 1. For instance, the lid 230 may be the same or similar to the lid 130 and may be selectively attachable to the container 210.

Figure 8:
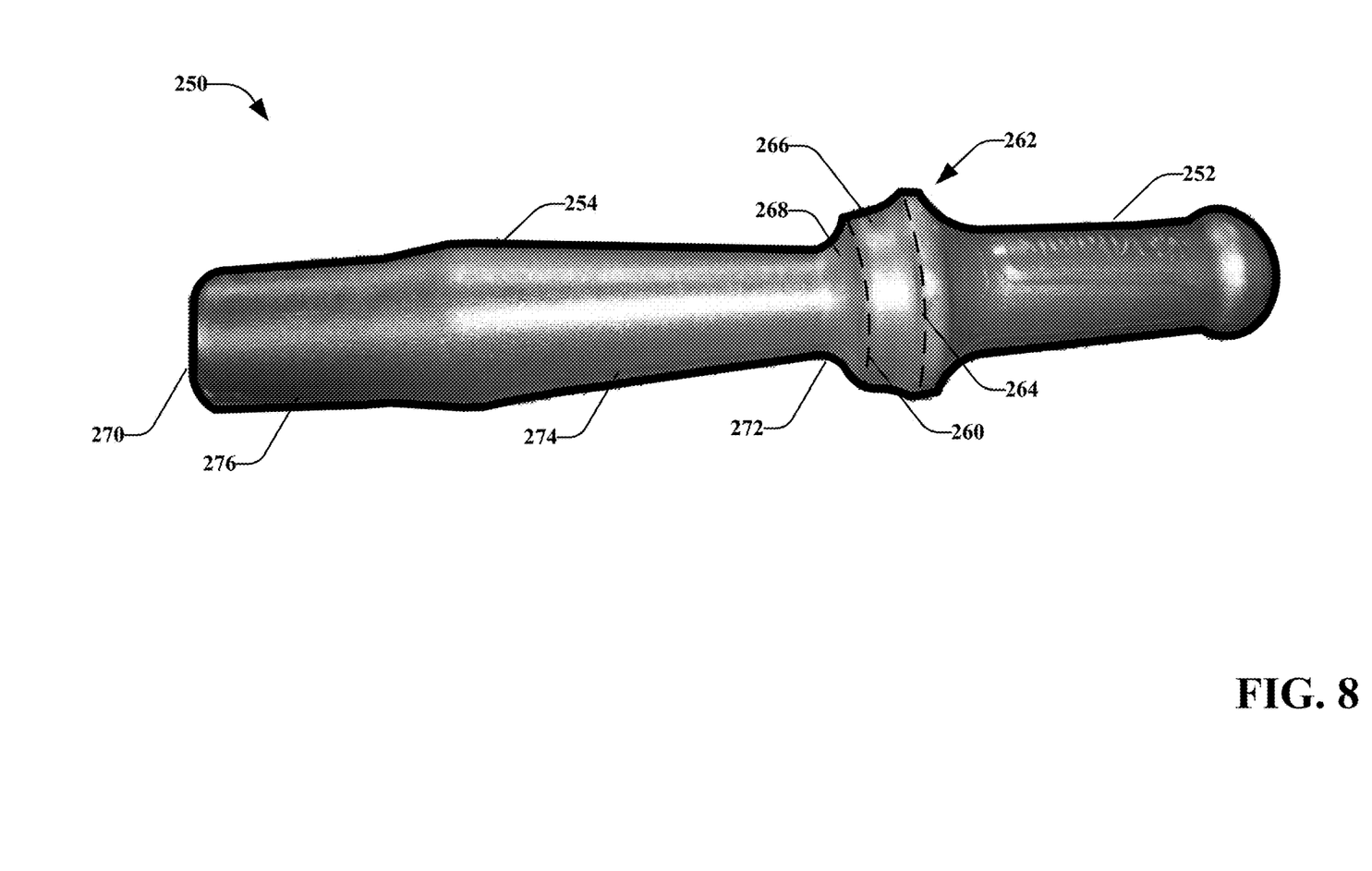
FIG. 8 is a side view of the tamper of FIG. 2 in accordance with various disclosed embodiments.

Turning to FIG. 8, with reference to FIG. 2, the tamper 250 may operatively provide a longer reach in certain positions than does tamper 150 or other tampers. The tamper 250 may include a handle 252, a stopping portion 262, and a mixing or tamping portion 254 having a terminal end 270 and a proximal end 272. It is noted that the tamper 250 may comprise other or different shapes and may be of an appropriate size for a given container. Moreover, the tamper 250 may comprise one or more materials such as food grade plastic, metal, wood, or other materials.

The handle 252 may be generally ergonomically shaped to allow a user to grasp the handle 252 with the user's hand(s). The stopping portion 262 may comprise two or more stop features, such as a vertical and/or angled first and second stops, and may be disposed between the handle 252 and the mixing or tamping portion 254 so that a user may grasp the handle 252 while the mixing or tamping portion 254 is disposed within a container 210 as described herein.

The mixing or tamping portion 254 may comprise various shapes. In at least some embodiments, the mixing or tamping portion 254 may include a first portion 274 that tapers out from the proximal end 272 near the stopping portion 262 so that the outer perimeter is generally increasing towards the terminal end 270. For instance, the first portion 274 may comprise a generally frustoconical portion with the vertex in the direction of the stopping portion 262. The mixing or tamping portion 254 may comprise a second portion 276 disposed between the first portion 274 and the terminal end 270. The second portion 276 may comprise a frustoconical portion with a vertex in the direction of the terminal end 270 such that the outer perimeter of the second portion 276 decreases from proximal the first portion 274 towards the terminal end 270. The terminal end 270 may comprise a generally flat or planar surface, a curved surface, or the like. In at least some embodiments, the terminal end 270 may comprise a blade-like surface (e.g., a scraping blade), a spoon, or the like.

Figure 9A:
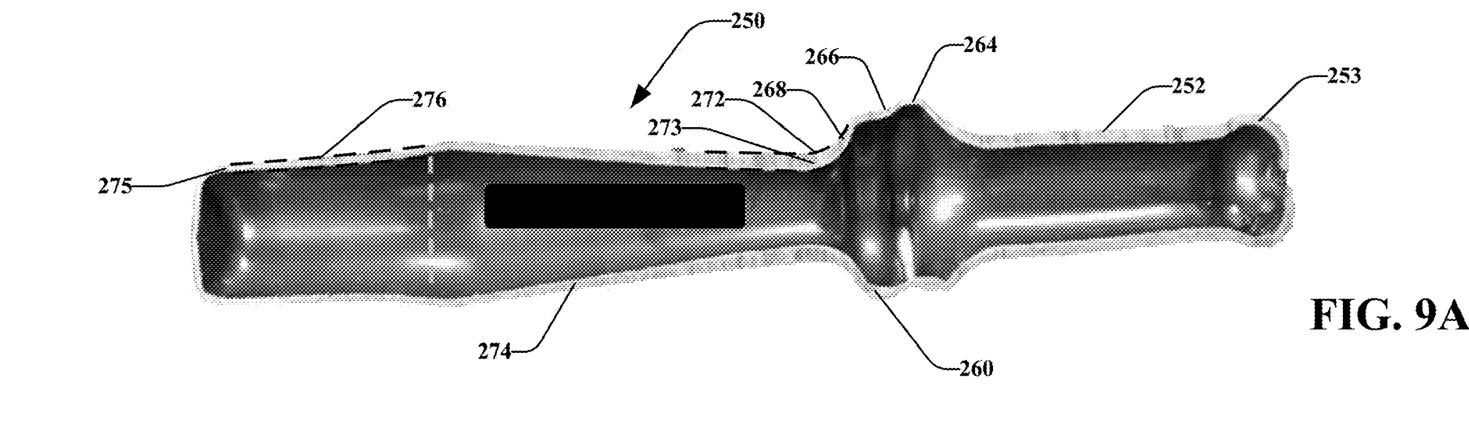
FIGS. 9A-B illustrate a cross-section view of the embodiments of the tamper of FIG. 2 in accordance with various disclosed embodiments.
Figure 9B:
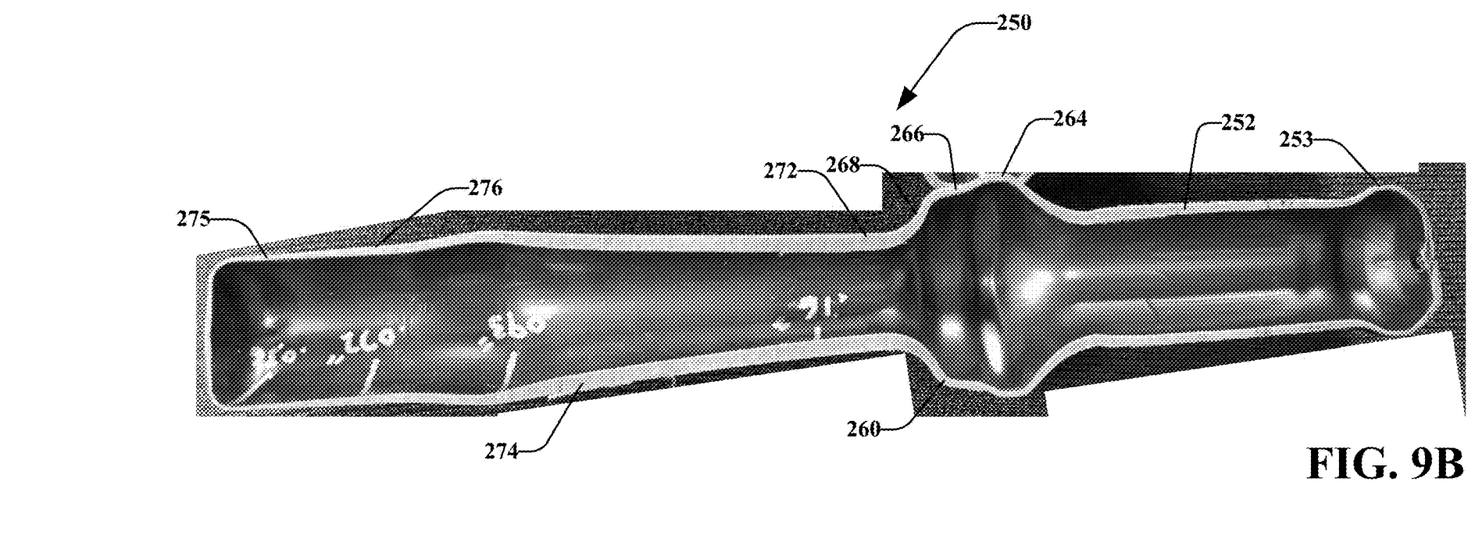

As shown in FIG. 9A-B, the sidewall thickness 275 of the second portion 276 may be between generally i units and j units, wherein i and j are numbers and units are units of measurements. In an example, the thickness may be between generally 0.03 inches and 0.08 inches. In another example, the thickness may be between generally 0.046 inches and 0.065 inches. The thickness 275 of the second portion 276 may provide for crush resistance, resistance to damage during blending processes, improved ability to manipulate food, or the like. The thickness 273 of the tramper 250 at the proximal end 272 may be increased relative other portions of the tamper 250. This thickness 273 may allow the outer diameter of at the proximal end 272 to be generally smaller than other portions of the mixing or tamping portion 254. In an aspect, the thickness 273 may be greater than at any other portion of the tamper 250. The thicknesses at the transition portion 268, first stop 260, transition portion 266, and second stop 264 may be general decreased relative the proximal end 272. In some embodiments, the tramper 250 may be thinnest at the second stop 264. It is noted that the handle 252 and a terminal end 253 of the tamper 250 may have thicknesses that are greater than that of the second stop 264 and less than the thickness 273. In an aspect, the tamper 250 may be generally crush or dent proof based on the thicknesses of the tamper 250 while generally minimizing or reducing the weight and material required for the tamper 250. It is noted, however, that some or all of the tamper 250 may be hollow, solid, partially hollow, reinforced with structural supports, or the like. For example, the handle 252 may have a thickness greater than other portions of the tamper 250, especially the second portion 276 to improve dent/crush resistance in an area that may otherwise be prone to additional forces. This construction may allow the overall tamper 250 to be generally dent/crush resistant while maintaining a light weight.

As described herein, the mixing portion 254 may comprise various other shapes, such as cylindrical, generally square, rectangular, elliptical, an n-sided polygon (where n is a number), elliptical, or irregular in shape. Moreover, embodiments may include a portion with a reduced diameter or perimeter size proximal the stopping portion 262. This may allow for increased range of motion as a user manipulates foodstuff within a container as described herein.

The stopping portion 262 may comprise two or more differently sized perimeters or stops, such as first stop 260 and a second stop 264. The first stop 260 may generally comprise a smaller perimeter or diameter than the second stop 264. In another aspect, the first stop 260 and the second stop 264 may be separated by a transition portion 266. In some embodiments, the first stop 260 may separate from the mixing portion 254 by a transition portion 268. The transition portions 266 and 268 may be a curved, tapered, frustoconical, or the like. For example, transition portion 268 may comprise a generally frustoconical portion with the vertex in the direction of the mixing portion 254. As such, proximal end 272 of the mixing portion 254 may comprise a generally smaller perimeter than the first stop 260 and the transition portion 268 may increase in perimeter towards the proximal end. In another example, portion 266 may comprise a generally frustoconical portion with the vertex in the direction of the first stop 260. As such, first stop 260 may comprise a generally smaller perimeter than the second stop 264 and the transition portion 266 may increase in perimeter towards the second stop 264. As described herein the transition portions 266 and 268 may comprise curved (e.g., concave or convex), tapered or irregular shapes.

In embodiments, the tamper 250 is operatively insertable within the aperture 232 of the lid 230. As noted herein, the aperture 232 is sized and shaped to receive the tamper 250. The aperture 232 may be generally square or may comprise a different shape, such as generally circular. As shown in FIG. 2, the tamper 250 may be inserted into the aperture 232 so that it is in a generally vertical position. The vertical position may include the tamper 250 generally centered within the aperture 232, generally perpendicular (e.g., such as between 80 and 100 degrees) to at least one of the lid 230 or a bottom 202 of the container 210. It is noted that the term "vertical position" is used to described a relative orientation of the tamper 250 pointed or directed towards the blade assembly 220. As such, other embodiments may include a vertical position where the tamper 250 is not perpendicular to the lid 230 or container bottom 212, such as in embodiments where the blade assembly 220 is not centered with the container bottom or the like.

In the vertical position, the first stop 260 contacts the aperture 232 to prevent the distal end 270 or other portion of the tamper 250 from contacting or interfering with the blade assembly 220. It is noted that the reach of the tamper 250 may be predetermined so that the tamper 250 is an appropriate distance away from the blade assembly 220.

Figure 3:
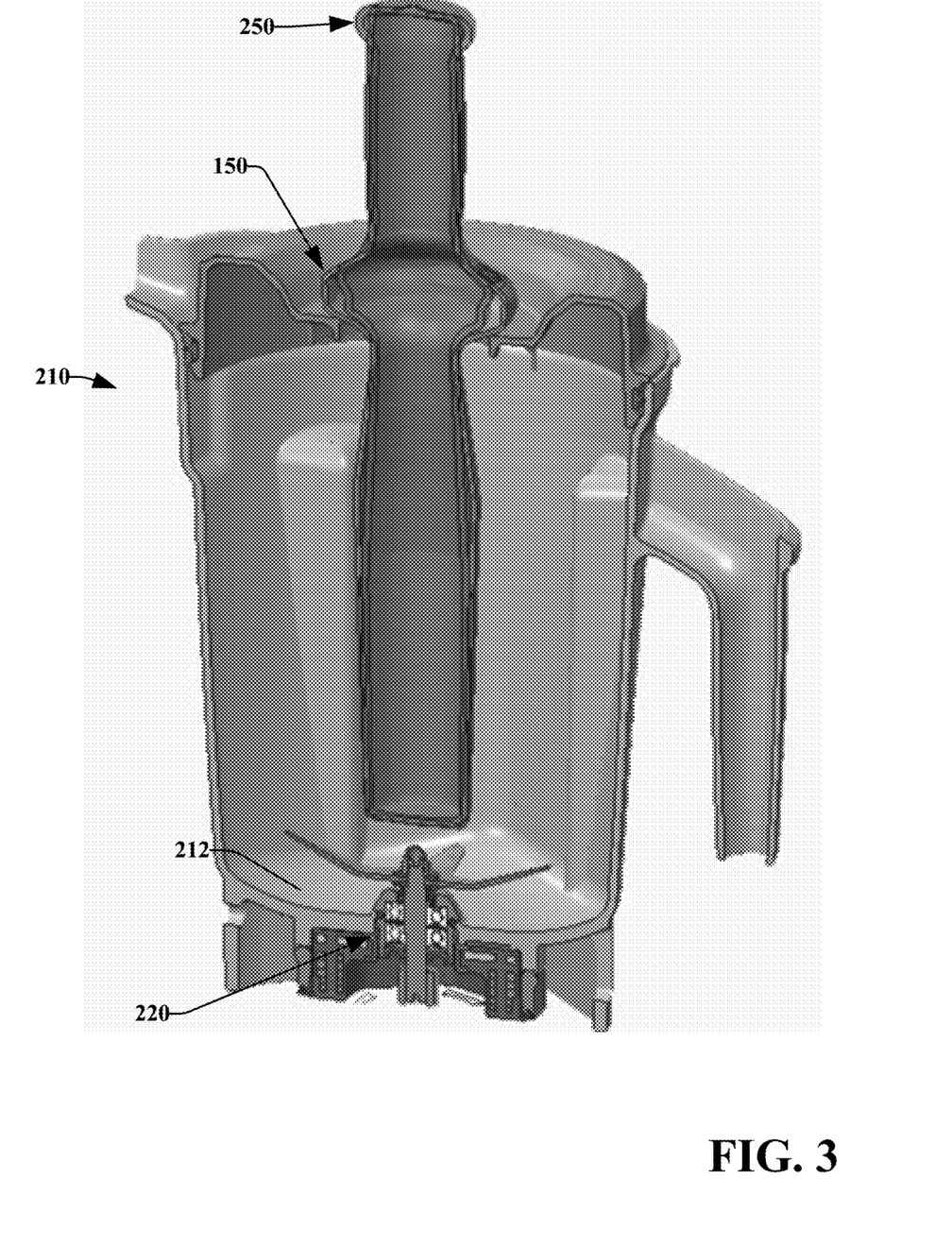
FIG. 3 is a cross-sectional view of a blending container comprising the traditional tamper of FIG. 1 overlaid onto the tamper of FIG. 2, both in a centered position in accordance with various disclosed embodiments.
Figure 6:
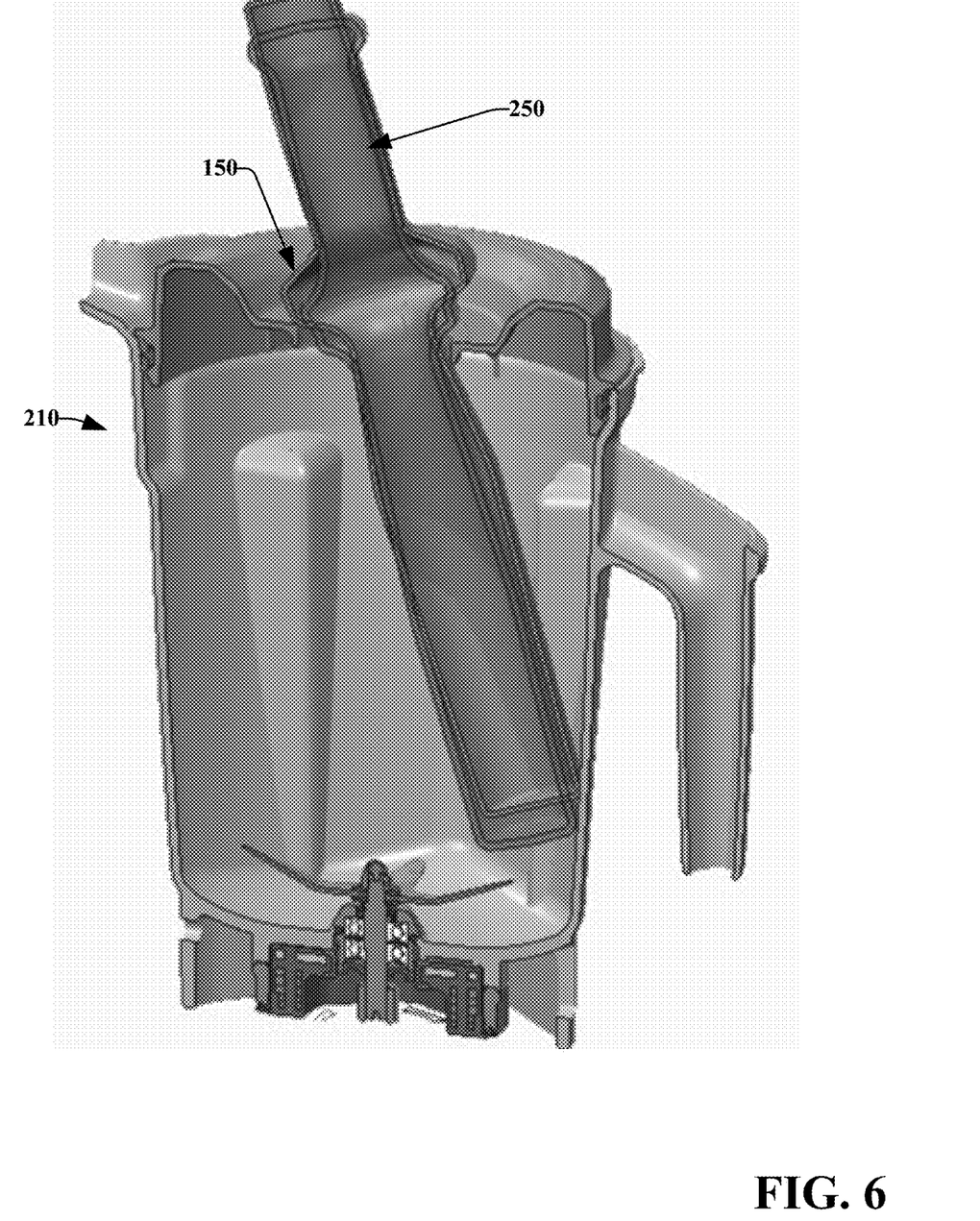
FIG. 6 is a cross-sectional view of a blending container comprising the traditional tamper of FIG. 1 overlaid onto the tamper of FIG. 2, both in an angled position in accordance with various disclosed embodiments.

FIG. 3 illustrates the tamper 250 in a vertical position and the tamper 150 in the vertical position. As shown, the tamper 250 and the tamper 150 may generally extend to the same distance and may have similar reaches. It is noted that tampers 250 and 150 may have different reaches in the vertical position. Tamper 150 is overlaid onto the tamper 250 for illustration. FIG. 3 is provided as an illustrative example and comparison when the tampers 250 and 150 are not in the vertical position such as shown in FIG. 6, and described in more detail herein.

Figure 4:
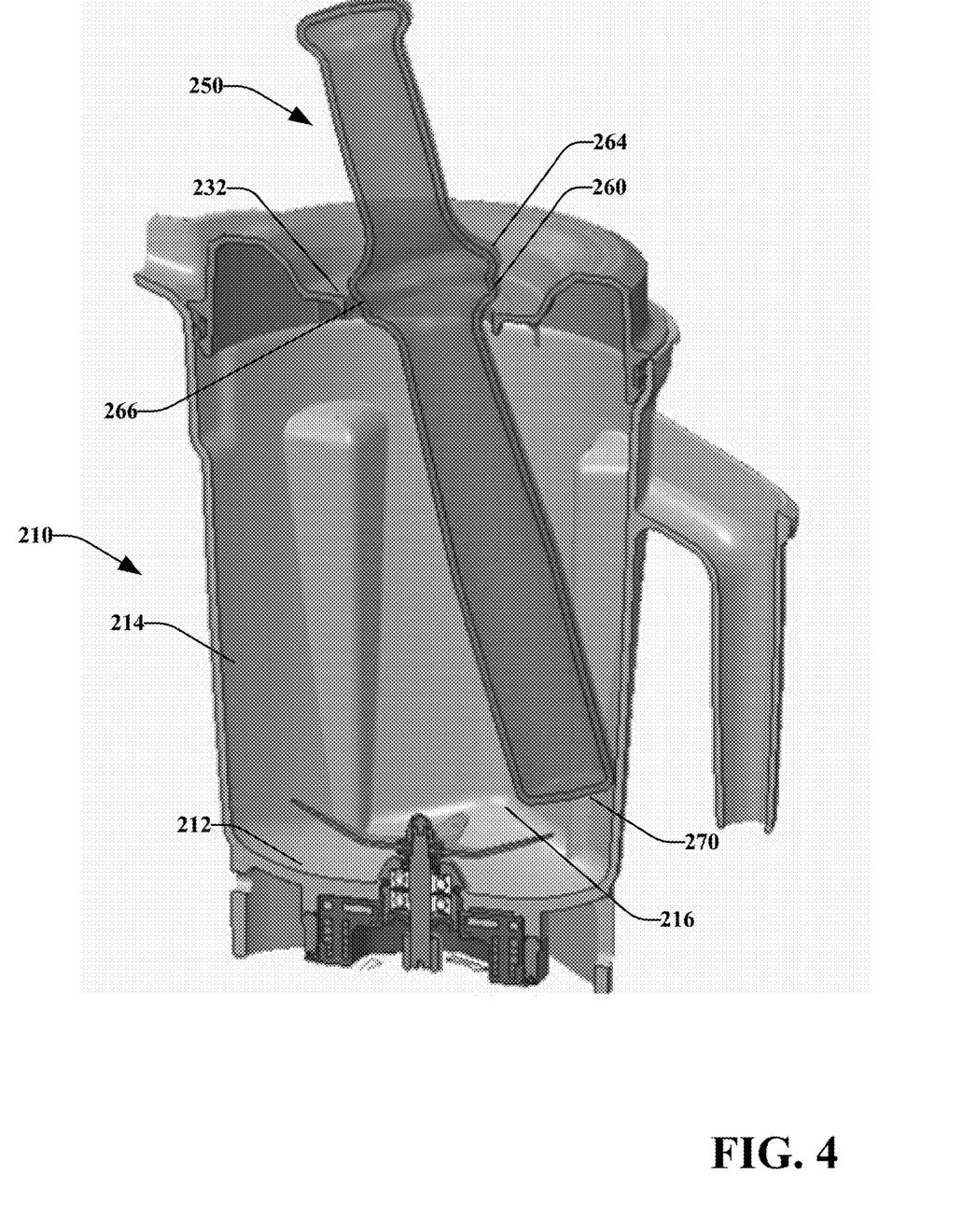
FIG. 4 is a cross-sectional view of the blending container and tamper of FIG. 2 with the tamper in an angled position in accordance with various disclosed embodiments.
Figure 5:
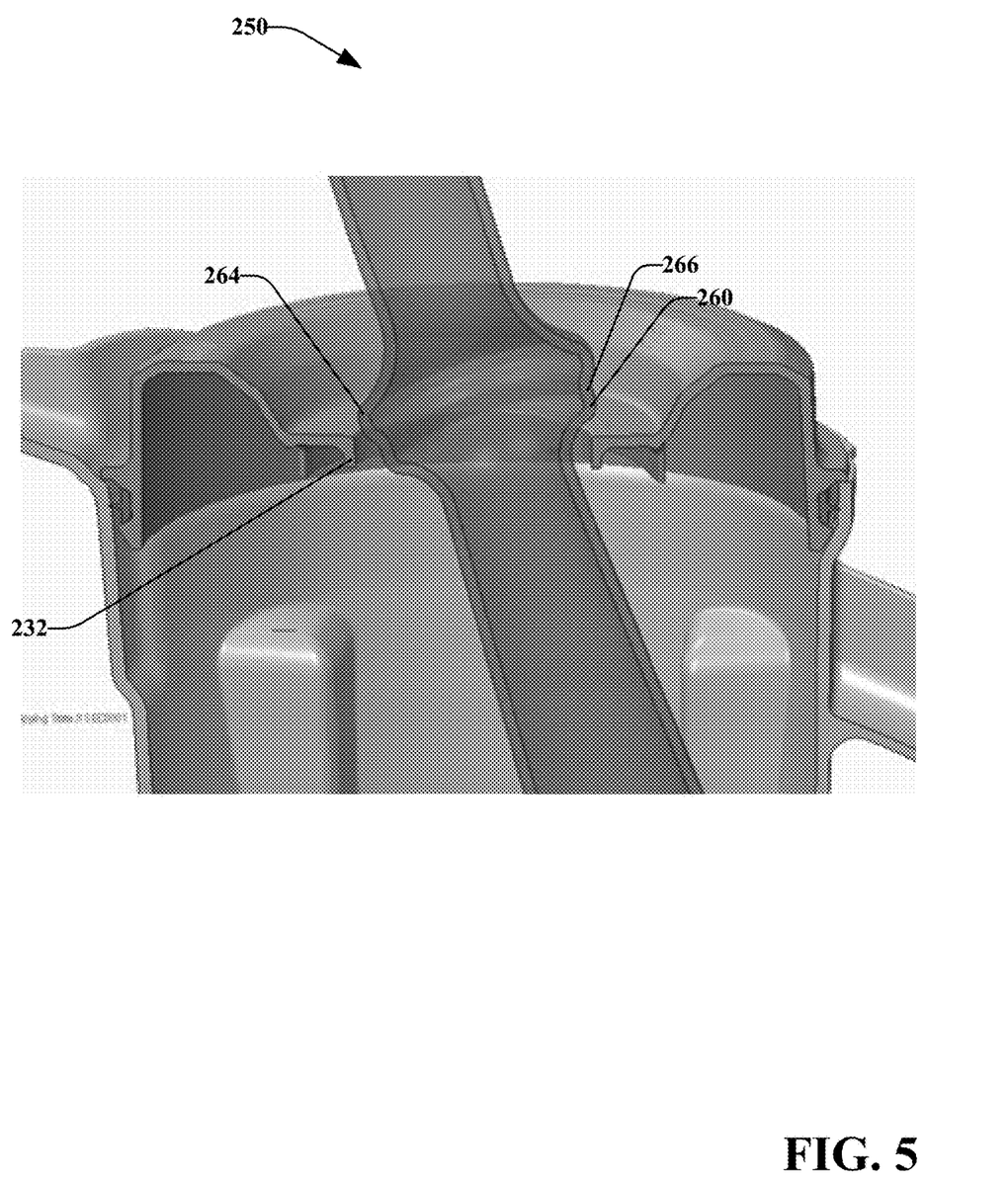
FIG. 5 is an enlarged cross-sectional view of the blending container and tamper of FIG. 2 with the tamper in an angled position in accordance with various disclosed embodiments.

FIGS. 4-5 illustrate the tamper 250 in a non-vertical or angled position. As described herein, the angled position describes the tamper 250 oriented in a position other than the vertical position. For instance, the distal end 270 of the tamper 250 may be angled away from the blade assembly 220. It is noted that the angled position may depend on the length of the tamper 250, the dimensions of the container 210, or the like. As such, the tamper 250 may be in the angled position when within a range of angles relative a plane defined by the aperture 232 or the bottom 212. The range may be, for example, between 85 and 45 degrees, between 70 and 45 degrees, between 80 and 30 degrees, between 70 and 30 degrees, or the like. In an example, the distal end 270 may be directed towards sidewalls 214 or corners 216 of the blending container 210. As described herein, the tamper 250 operatively provides for an extended reach towards the sidewalls 214 or corners 216 so that a user may manipulate foodstuff in various directions. The tamper 250 may allow the distal end 270 to be inserted further within the container 210 when in the angled position as the distance to the blade assembly 220 and the distal end 270 is increased. This may provide for an extended reach without the tamper 250 interacting with the blade assembly 220 in the angled position or the vertical position.

It is noted that in at least some embodiments the tamper 250 may not include the transition portion 266 and/or the second stop 264. In such embodiments, the tamper 250 may have a generally shorter reach than embodiments that include the transition portion 266 and/or the second stop 26. Embodiments that do not include the transition portion 266 and/or the second stop 26 may be sized and shaped such that the first stop 260 is insertable within the aperture 232 at in the angled position, but a portion of the first stop 260 may contact the aperture 232 to prevent contact with the blade. In another aspect, the distal end 270 may contact the sidewalls 214 or a protrusion from the sidewalls so that the distal end 270 does not contact the blade assembly 220. In another aspect, the transition portion 266 and/or the second stop 264 may provide increased reach and may distribute a load as well as reduce or minimize or reduce deformation of the first stop 260 (e.g., such as when lid 230 comprises a deformable rubber) due to aggressive tamping.

As a user angles or moves the tamper 250 from the vertical position towards a corner 216 or sidewall 270, a portion of the first stop 260 may pass through or into the aperture 232. This may bypass the first stop 260. The aperture 232 may then contact the transition portion 266 or the second stop 264. In an aspect, the second stop 264 prevents the distal end 270 from being inserted beyond a determined length or distance so that the distal end 270 will not contact the blade assembly 220. According to embodiments, the first stop 260 and the second stop 264 may comprise a lip, ledge, tapered portion, angled or curved portion, or the like. The position, size, and shape of the first stop 260 may control the reach or depth of insertion in the vertical position of the tamper 250. The position, size, and shape of the second stop 264 may control the reach or depth of insertion in the angled position of the tamper 250.

Figure 7:
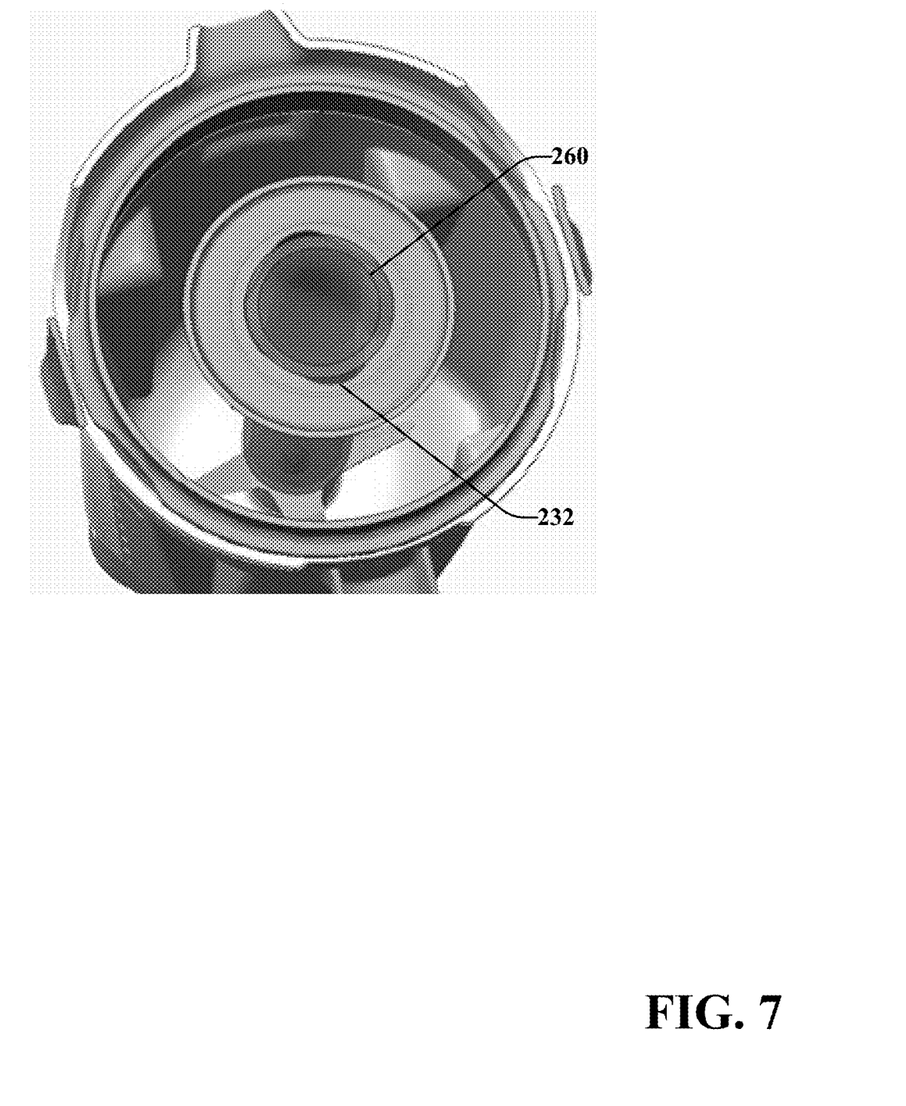
FIG. 7 is a top view of the blending container and tamper of FIG. 2 in a vertical position in accordance with various disclosed embodiments.

In another aspect, the first stop 260 and the second stop 264 may be generally circular or otherwise round as shown in FIG. 7. It is noted that the lid 230 is shown in a partial cross-sectional view so that relative positions are viewable. The aperture 232 may be generally square, rectangular, or the like. In at least one embodiment, the shape of the first stop 260 and the second stop 264 are different from the shape of the aperture 232. In examples, the round first stop 260 and the second stop 264 do not fit into a square aperture 232. This effectively limits how far in the tamper 250 may be inserted for vertical insertion. When angled, however, the first stop 260 passes into or through the aperture 232 and the second stop 264 contacts the aperture 232 to control the depth in the angled position.

Figure 10:
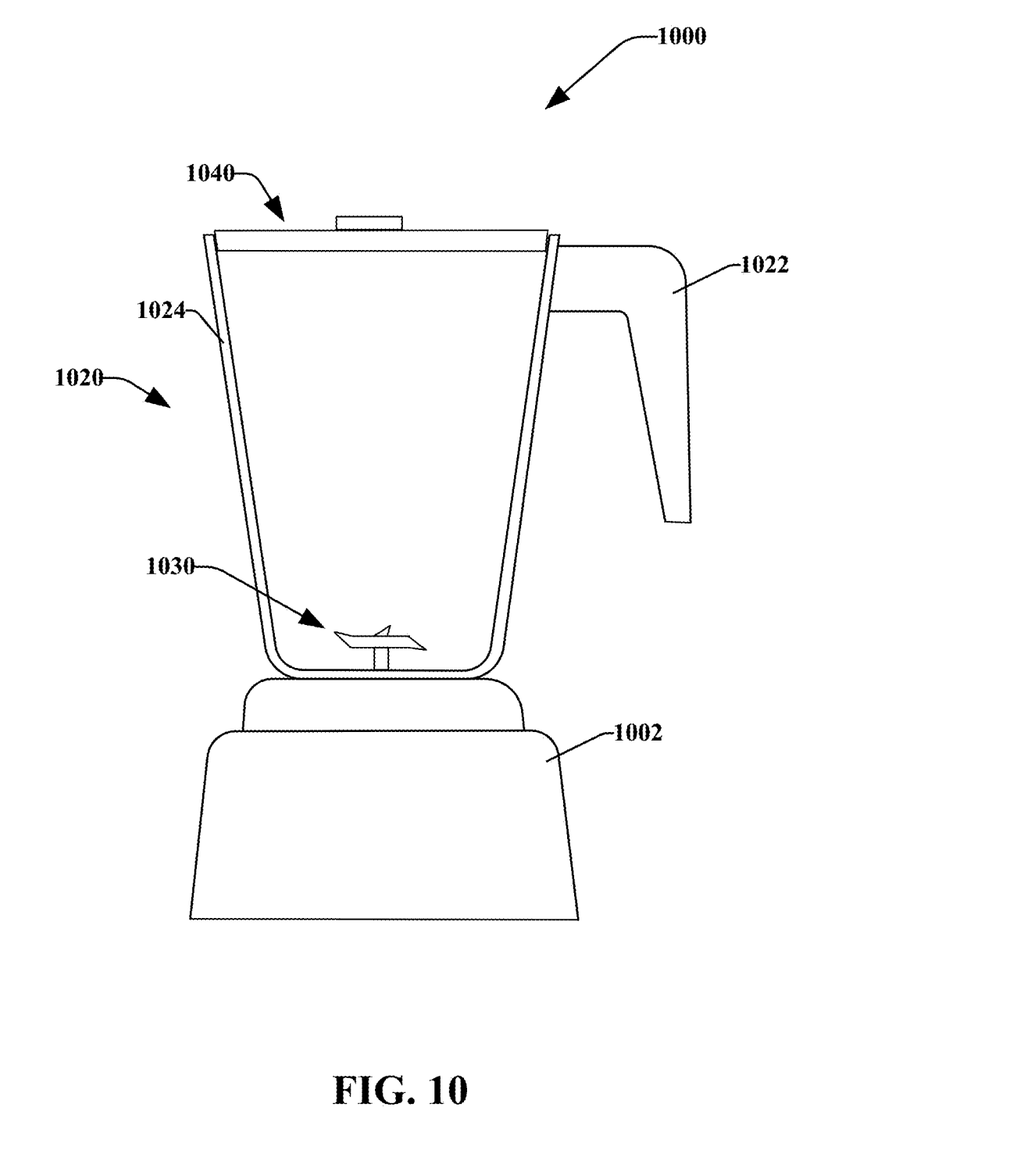
FIG. 10 is a blending system in accordance with various disclosed embodiments.

FIG. 10 illustrates an exemplary blending system 1000 in accordance with various disclosed embodiments. System 1000 may utilize various disclosed aspects. For instance, system 1000 may include a container and a tamper as described herein. It is noted that blending system 1000 may allow for interchangeable containers.

System 1000 primarily includes a blender base 1002, a container 1020 (or 210) operatively attachable to the blender base 1002, a blade assembly 1030, and a lid 1040 (or 230) that may be operatively attached to the container 1020. Tamper 250 may be utilized to manipulate foodstuff within the container 1020. The container 1020 may include walls 1024 and a handle 1022. Foodstuff may be added to the container 1020 for blending. It is noted that the container 1020 may comprise various materials such as plastics, glass, metals, or the like. In another aspect, container 1020 may be powered in any appropriate manner.

The blade assembly 1030, container 1020, and base 1002 may removably or irremovably attach. The container 1020 may be powered in any appropriate manner. While shown as a large-format system, system 1000 may comprise a single serving style system, where the container is filled, a blender base is attached to the container, and then the container is inverted and placed on a base. In another aspect, the container 1020 may comprise different sizes and shapes, such as cylindrical or the like.

The base 1002 includes a motor disposed within a housing 1003. The motor selectively drives the blade assembly 1030. The blade assembly 1030 may agitate, impart heat, or otherwise interact with contents within the container.

In at least one embodiment, the blending system 1000 may identify or detect whether the system 1000 is interlocked through mechanical detection (e.g., push rods), user input, image recognition, magnetic detection (e.g., reed switches), electronic detection (e.g., inductive coils, a near field communication (NFC) component), or the like.

System 1000 and processes described herein generally relate to blending or food-processing systems and include a food-processing disc comprising one or more inductive coils. In another aspect, one or more of the disc(s) and/or lid may comprise an NFC component that may interact with an NFC component of a blender base. The NFC component of the blender base may receive information regarding the type of container and the blender base may utilize the information to determine a blending process to be utilized by the system.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define embodiments disclosed herein. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A blending system comprising:
   a container;
   a lid attached to the container, wherein the lid comprises an aperture formed therethrough;
   a blade assembly operatively attached to the container; and
   a tamper comprising a mixing portion and a ledge;
   wherein the tamper is operatively insertable into the aperture in a first position where the ledge engages the lid and prevents the ledge from passing through the aperture, and wherein the tamper is operatively insertable into the aperture in a second position where at least a portion of the ledge passes through the aperture, wherein in the first position the tamper is generally perpendicular to a bottom of the container and wherein in the second position the tamper is generally pointed in the direction of at least one of a side wall or corner of the container.

2. The blending system of claim 1, wherein the ledge comprises at least a first ledge and a second ledge.

3. The blending system of claim 2, wherein the first ledge limits insertion of the tamper into the container in the first position.

4. The blending system of claim 3, wherein the second ledge does not touch the aperture in the first position.

5. The blending system of claim 3, wherein the second ledge limits insertion of the tamper into the container in the second position.

6. The blending system of claim 2, wherein the ledge further comprises a transition portion disposed between the first ledge and the second ledge, wherein the transition portion comprises at least one of a curved or angled surface.

7. The blending system of claim 2, wherein the first ledge comprises a flange.

8. The blending system of claim 2, wherein the second ledge comprises a flange.

9. The blending system of claim 2, wherein the aperture comprises a different shape than the first ledge or the second ledge.

* * * * *